(12) United States Patent
Feuerherm et al.

(10) Patent No.: US 9,713,895 B2
(45) Date of Patent: Jul. 25, 2017

(54) NOZZLE FOR EXTRUDING A PREFORM TUBE

(71) Applicants: Harald Feuerherm, Troisdorf (DE); Guenther Kappen, Troisdorf (DE)

(72) Inventors: Harald Feuerherm, Troisdorf (DE); Guenther Kappen, Troisdorf (DE)

(73) Assignee: Harald Feuerherm, Troisdorf (DE)

( * ) Notice: Subject to any disclaimer, the term of this patent is extended or adjusted under 35 U.S.C. 154(b) by 303 days.

(21) Appl. No.: 14/473,404

(22) Filed: Aug. 29, 2014

(65) Prior Publication Data

US 2015/0064302 A1  Mar. 5, 2015

(30) Foreign Application Priority Data

Aug. 30, 2013 (DE) .................. 10 2013 109 495
Aug. 11, 2014 (EP) ..................... 14180578

(51) Int. Cl.
*B29C 47/22* (2006.01)
*B29C 47/20* (2006.01)
(Continued)

(52) U.S. Cl.
CPC .......... *B29C 47/20* (2013.01); *B29C 47/0054* (2013.01); *B29C 47/085* (2013.01); *B29C 47/22* (2013.01); *B29C 47/92* (2013.01); *B29C 49/04* (2013.01); *B29B 11/10* (2013.01); *B29C 47/0023* (2013.01); *B29C 47/0806* (2013.01); *B29C 47/0808* (2013.01); *B29C 47/225* (2013.01); *B29C 2947/92152* (2013.01);
(Continued)

(58) Field of Classification Search
CPC ..... B29C 47/085; B29C 47/22; B29C 47/225; B29C 47/92; B29C 2947/92647; B29C 2947/92904
See application file for complete search history.

(56) References Cited

U.S. PATENT DOCUMENTS 4,080,131 A * 3/1978 Bahder ................. B29C 35/065
                                                              425/113
5,286,183 A * 2/1994 Tonsi .................. B29C 47/0016
                                                              425/113
(Continued)

FOREIGN PATENT DOCUMENTS

DE   102009058361 B   6/2011
DE   102012022409 B   5/2013

*Primary Examiner* — Yogendra Gupta
*Assistant Examiner* — Joseph Leyson
(74) *Attorney, Agent, or Firm* — Andrew Wilford

(57) ABSTRACT

An extrusion nozzle for making tubular preforms has a mandrel extending along a vertical axis, an annular and stationary nozzle body spacedly radially surrounding the mandrel, and a holding ring having an upper end axially slidable in the nozzle body, braced axially downwardly against the nozzle body, and having a lower end spaced radially inward from shiftable limitedly radially relative to the nozzle body. A nozzle ring has an upper end axially slidable in the holding ring, is braced axially downwardly against the nozzle body, and has a radially deflectable lower end forming an annular extrusion gap with the mandrel. A first positioner engages the lower end of nozzle ring and is operable to radially deflect this lower end. A second positioner engages radially with the lower end of the holding ring or with the nozzle ring for radially deflecting same.

20 Claims, 20 Drawing Sheets

(51) Int. Cl.
*B29C 49/04* (2006.01)
*B29C 47/92* (2006.01)
B29C 47/00 (2006.01)
B29C 47/08 (2006.01)
B29B 11/10 (2006.01)

(52) U.S. Cl.
CPC .............. *B29C 2947/92447* (2013.01); *B29C 2947/92628* (2013.01); *B29C 2947/92647* (2013.01); *B29C 2947/92904* (2013.01)

(56) References Cited

U.S. PATENT DOCUMENTS

| | | | | |
|---|---|---|---|---|
| 5,690,971 A | * | 11/1997 | Buluschek | B29C 47/225 277/644 |
| 7,278,844 B2 | | 10/2007 | Koetke | |
| 2003/0203067 A1 | * | 10/2003 | Guillemette | B29C 47/0016 425/381 |

* cited by examiner

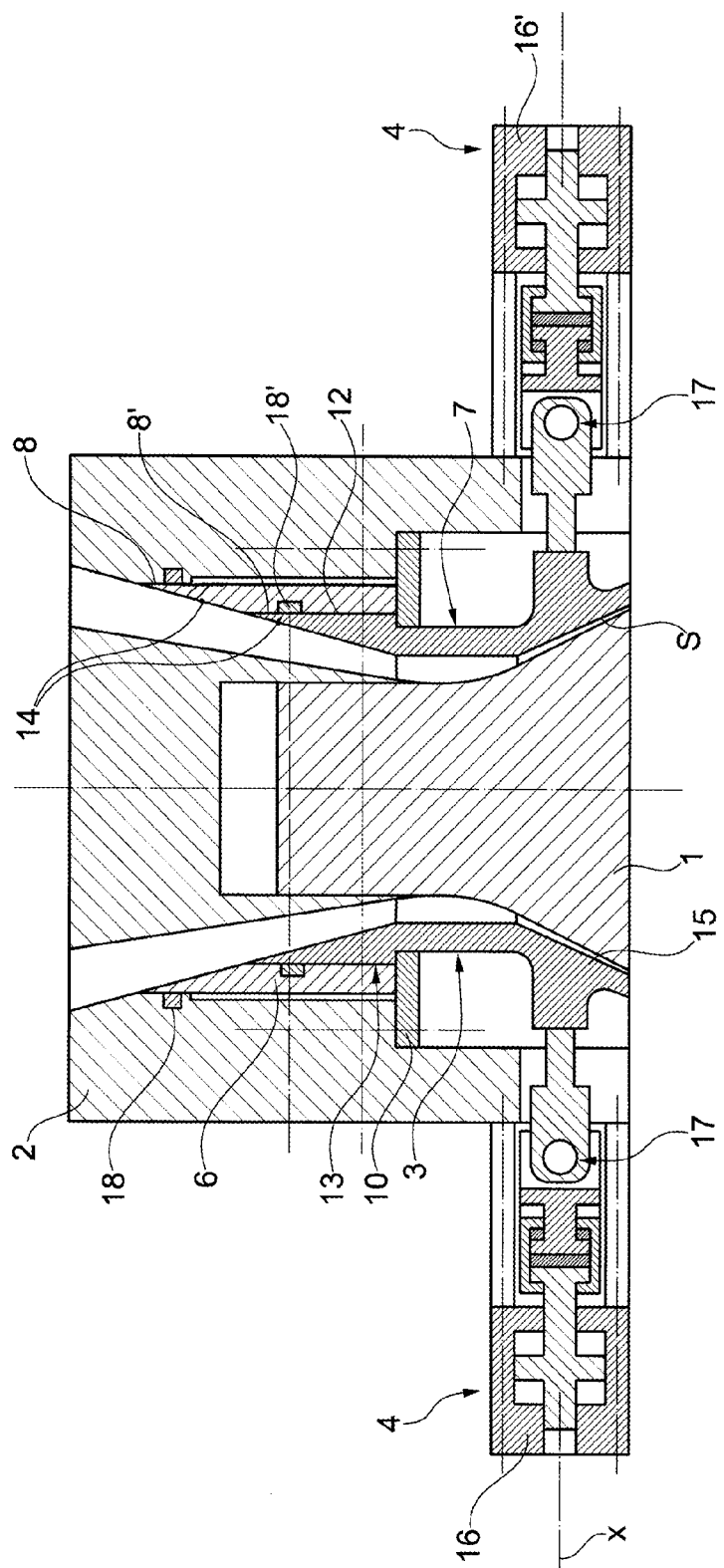

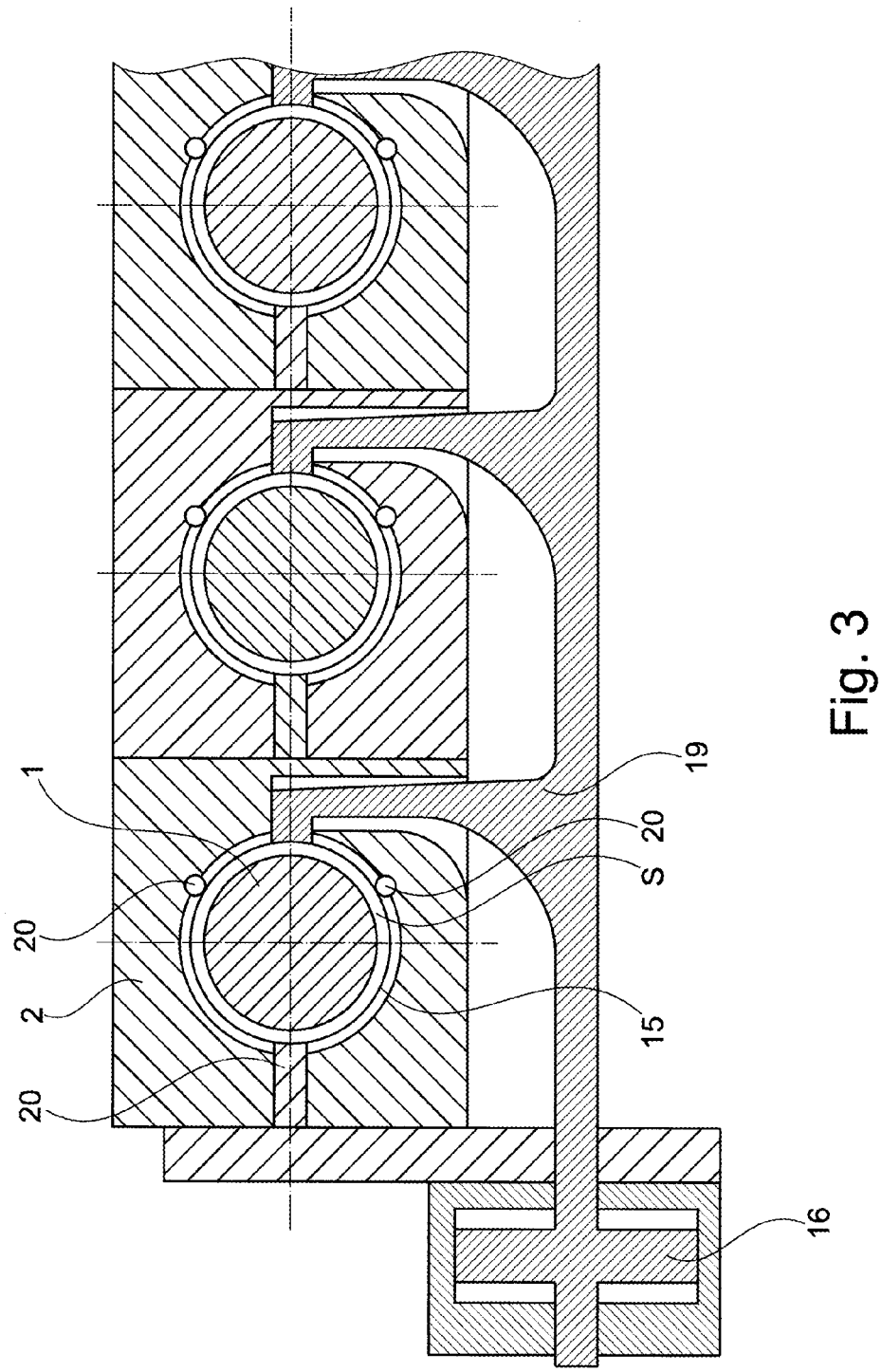

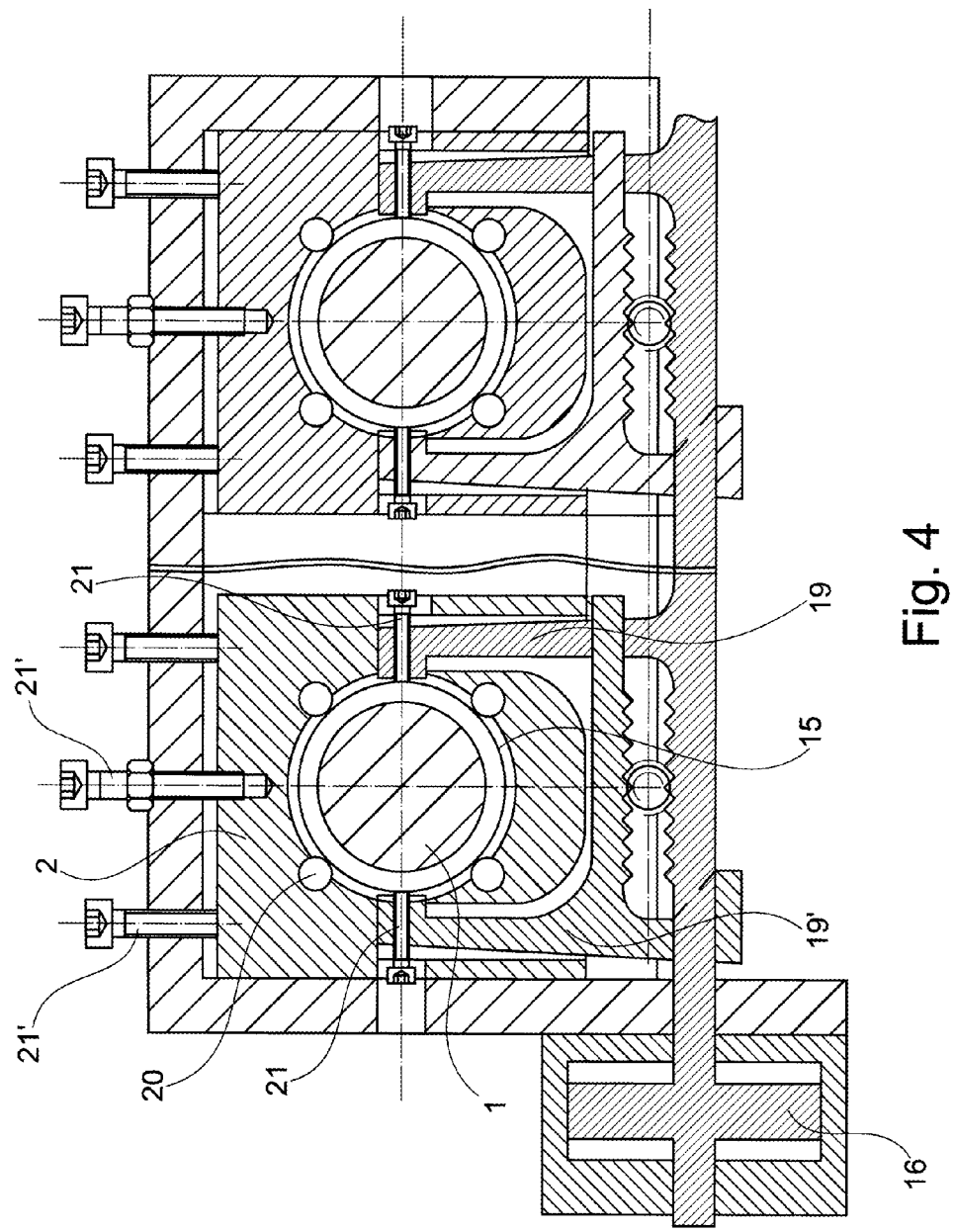

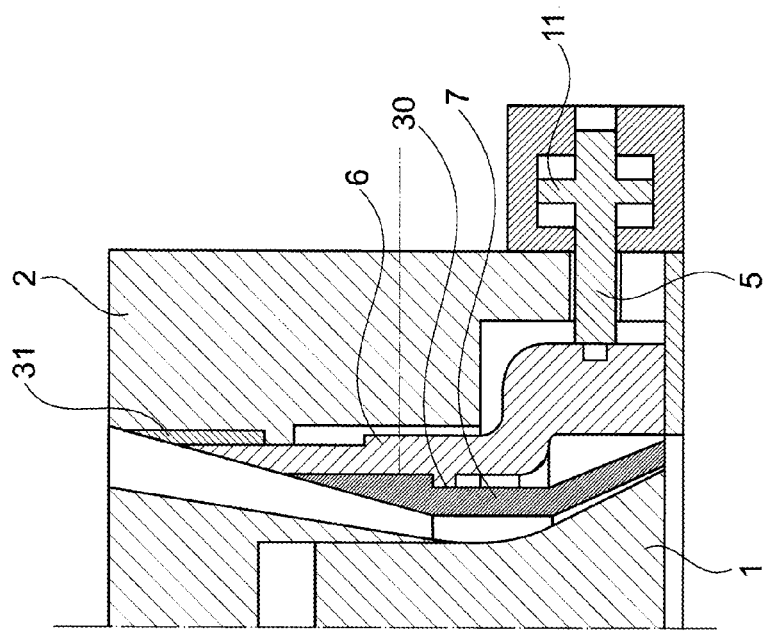
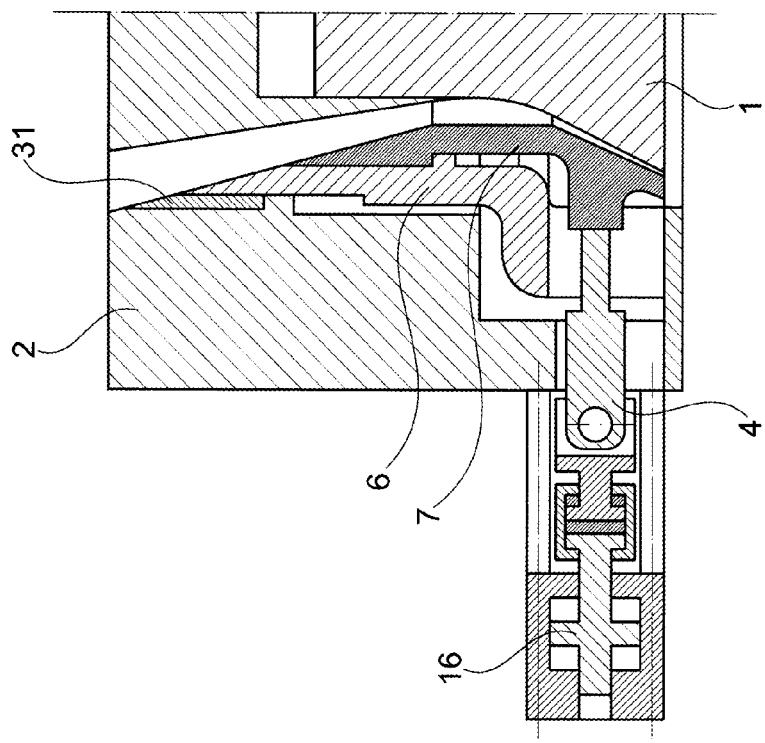
Fig. 14A
Fig. 14B

NOZZLE FOR EXTRUDING A PREFORM TUBE

FIELD OF THE INVENTION

The present invention relates to a nozzle for extruding a tube. More particularly this invention concerns a nozzle for extruding a preform tube.

BACKGROUND OF THE INVENTION

A nozzle for making a tubular preform typically has a mandrel, a nozzle body, an annular nozzle insert surrounding the mandrel and forming an annular gap, and positioners for radially acting on the nozzle insert. The mandrel and the nozzle insert are adjustable relative to one another by programmable adjustment motions of the mandrel and/or of the nozzle body during the extrusion of the preforms. This causes the preforms exiting the extrusion nozzle to have a wall thickness profile that changes axially. Angularly, the width of the annular gap can be changed by radially adjusting and/or elastically deforming the nozzle insert. The positioners can be manually actuatable devices or actuators that execute programmable adjustment motions. The programmable adjustment motions of the actuators can be used to change the melt distribution of the preforms angularly of the preform as it exits the extrusion nozzle during preform extrusion. The preforms can be extruded continuously or discontinuously. The preforms exiting the extrusion nozzle are fed to a blow molding cavity of a clamping unit. The preforms are expanded in the blow molding cavity by air after under pressure the interior has been closed to form a hollow plastic member. The preforms can also have a co-extruded multi-layered design.

An extrusion nozzle with the features described above is known from U.S. Pat. No. 7,278,844. The nozzle insert of the known extrusion nozzle has a rigid annular member that has a spherical crown shaped outer surface at the upper end thereof, the surface being pivotably held in a complementary bearing shell. By executing a tilting displacement of the nozzle insert, the width of the annular gap can be changed angularly. However, it is not possible to vary the shape of the annular gap angularly. Furthermore, the spherical bearing of the annular member is expensive to make and subject to wear.

DE 10 2009 058 361 describes an extrusion nozzle that also has the features described above. The nozzle insert of this extrusion nozzle has a rigid end part and an elastically deformable mouth area at the nozzle outlet. The melt passage is sealed off near the separation between the nozzle body and the nozzle insert by an elastically deformable ring seal. The nozzle insert sitting against the ring seal is mounted and tiltable in any direction. The ring seal is subject to high temperatures and pressures in the melt passage of the extrusion nozzle. It must be sufficiently pliable that the nozzle insert supported at the end at the ring seal can make the desired tilting motions. In the event of tilting, the pressure distribution in the ring seal is uneven and areas result where, depending on the tilt angle of the nozzle insert, the ring seal is very compressed and areas where the ring seal is uncompressed, causing the sealing effect to be correspondingly reduced. The sealing of the nozzle ring at a pliable, elastic ring seal is therefore problematic. There is also the danger that during a significant deformation the ring seal projects into the melt passage, producing nonhomogeneities in the melt flow. In the known design, the deformable mouth area is formed in one piece onto the end part. The nozzle insert, which has a rigid end part and a thin-walled, deformable mouth area, is a physically complicated component that is difficult to make and is consequently also an expensive component.

DE 10 2012 022 409 describes an extrusion nozzle that has a three-function component. The three-function assumes three functions important for the use of the extrusion nozzle. It must fulfill a sealing function and facilitate both a tilting motion of the nozzle insert and a longitudinal displacement of the nozzle insert inside the nozzle body. The axial adjustment travel of the longitudinal displacement is dimensioned such that the wall thickness of the tubular preforms exiting the extrusion nozzle can be changed. The three-function component is a temperature-resistant elastomer component that is held in a groove in a positive lock. High demands are placed on the material of the elastomer component. Whether the three-function component can meet these requirements in practice is questionable.

OBJECTS OF THE INVENTION

It is therefore an object of the present invention to provide an improved nozzle for extruding a preform tube.

Another object is the provision of such an improved nozzle for extruding a preform tube that overcomes the above-given disadvantages, in particular that can be changed angularly variably, all moving parts of the extrusion nozzle that come into contact with the plastic melt being effectively sealed off from fixed parts and the sealing effect is independent of the tilt angle of the nozzle insert.

The extrusion nozzle should also have a compact and simple physical design.

SUMMARY OF THE INVENTION

An extrusion nozzle for making tubular preforms has according to the invention a mandrel extending along a vertical axis, an annular and stationary nozzle body spacedly radially surrounding the mandrel, and a holding ring having an upper end axially slidable in the nozzle body, braced axially downwardly against the nozzle body, and having a lower end spaced radially inward from shiftable limitedly radially relative to the nozzle body. A nozzle ring has an upper end axially slidable in the holding ring, is braced axially downwardly against the nozzle body, and has a radially deflectable lower end forming an annular extrusion gap with the mandrel. A first positioner engages the lower end of nozzle ring and is operable to radially deflect this lower end. A second positioner engages radially with the lower end of the holding ring or with the nozzle ring for radially deflecting same.

Thus the annular nozzle insert has at least two tubular sections nested in one another, the connection area being a slide seat. Also, the multiple-part component is held within the nozzle body by a slide seat. Hence, the covering of the connection regions forming a slide seat also assumes a sealing function. Subdividing of the annular nozzle insert into a plurality of parts that move relative to one another creates a sufficient amount of flexibility to be able to change the annular gap at the nozzle outlet angularly. If the first positioner acts radially on the nozzle ring and the second positioner is associated with the holding ring, a functional decoupling of the displacement axes occurs, which has an advantageous effect on the displacement possibilities, precision of displacement and seal of the extrusion nozzle. This embodiment is advantageous primarily for large nozzle diameters and/or in the use of a nozzle ring that has an elastically deformable nozzle ring section. For small nozzle diameters and/or a rigid nozzle ring, the second positioner can also be associated with the nozzle ring just like the first positioner. Displacement of the nozzle ring is then effected directly on the radially moving ridge of the holding ring, which leads to the direct shifting thereof.

To improve the sealing function, a ring seal can be provided between the nozzle body and the holding ring on the one hand or between the holding ring and the nozzle ring on the other hand, the ring seal being disposed near the slide seat. Suitable ring seals include elastically deformable ring seals as well as hard material rings made of friction materials commonly used as mechanical seals. The ring seal has at least one seal ring made of a temperature-resistant material independent of the specific embodiment.

The force application direction of the first positioner and the force application direction of the second positioner can be in any direction relative to one another corresponding to the shape of the nozzle gap desired. For example, the direction of the radial force acting on the nozzle ring and the direction of a radial force acting on the holding ring can align or can be directed parallel to one another with an axial offset. Further, the radial force from the first positioner acting on the nozzle ring and the radial force from the second positioner acting on the holding ring or the nozzle ring can be directed angularly under any arbitrarily established angle relative to one another.

For example, the holding ring of the nozzle insert is supported radially movably on a support that is fixed in the installation space of the nozzle body. The support can be a support ring in particular or can comprise an arrangement of segments at which support is provided in the form of a bayonet joint. The axial support of the holding ring can be affected at the lower end of the holding ring. Other embodiments of the support and positioning of the support should not be excluded. What is important is that the axial support of the holding ring does not limit the radial mobility of the ridge thereof.

The holding ring can also extend to the bottom end of the nozzle insert. For example, a support ring can be used as a support for supporting the holding ring. Other embodiments of the support should also be encompassed. In particular, the support can be an arrangement of segments where axial support in the form of a bayonet joint is possible, the bayonet joint permitting a sufficient radial mobility of the holding ring below the slide seat thereof.

Finally, the invention should also include physical embodiments in which the nozzle ring is supported in the nozzle body or on a support fastened to the nozzle body and in which the holding ring is axially supported at the nozzle ring.

At the outer periphery of the holding ring, it is useful for the holding ring to comprise a cylindrical peripheral outer surface machined as a seating surface that extends into a cylindrical hole of the nozzle body or into an intermediate sleeve disposed in the nozzle body. In the process, the intermediate sleeve can be held within the nozzle body by a slide seat. The intermediate sleeve, which is preferably guided in the nozzle body with a loose fit, can further improve the flexibility and sealing function. It is useful for the cylindrical peripheral outer surface of the holding ring and the respective cylindrical surface of the intermediate ring or the cylindrical hole to fit together with play.

The holding ring preferably comprises at least one annular section between the slide seat and a force application point of the second positioner acting on the holding ring or the nozzle ring, the annular section effecting a bending of the holding ring under the effect of a radial force produced by the second positioner. The material of the holding ring and the wall thickness of the holding ring in this annular section are matched to the position of the force application point and to the possible adjustment path of the positioner such that the bending of the holding ring elastically reverses at least partially after the radial force acting thereon is released. The holding ring is a metal sleeve. The holding ring can also be made of a composite material that is of an application-specific layer construction in the area of the ridge, the layer design differing from the normal construction of the ring. Further, the holding ring can also have a weak zone manufactured as a recess, the weak zone supporting bending of the holding ring under the effect of a radial force. Any deformation of the holding ring and play in the slide seat are critical to the tilting displacement of the nozzle insert in the axis specified by the force application direction of the second positioner.

The second positioner has at least one actuator that transmits pushing forces to the holding ring or nozzle ring, or that is connected to the holding ring or nozzle ring by a connection that transmits the radial pulling and pushing forces.

The nozzle ring of the nozzle insert has a cylindrical slide surface at the upper end of the ring and surrounded by the holding ring. The slide surface of the nozzle ring and an associated cylindrical inner surface of the holding ring are fitted together with play here. The nozzle ring can comprise a collar at the upper end thereof, the collar being carried on a support and being radially movable, where for example the support can be a support ring. According to a preferred embodiment of the invention, the collar of the nozzle ring and the holding ring are supported by the same support ring.

An alternative embodiment provides that the nozzle ring below the slide seat thereof is fastened to the holding ring by a removable positive-lock connection that permits radial relative motions. This embodiment of the invention is of interest especially when the holding ring extends down to the bottom end of the nozzle insert. The positive-lock connection between the nozzle ring and the holding ring can be a bayonet joint. An advantage of this embodiment is that the nozzle ring can be quickly replaced without having to remove the holding ring.

The collar of the nozzle ring and the section of the holding ring surrounding the collar form a rigid middle piece of the nozzle insert. It is preferable for the second positioner that enables tilting of the nozzle insert to act on the rigid middle piece of the nozzle insert.

An advantageous embodiment of the device according to the invention provides that the ridge of the holding ring and the radially moving nozzle ring section of the nozzle ring are kinematically coupled. The kinematic coupling causes an adjustment force applied to the holding ring to also result in a defined, verifiable and reproducible change in the position of the nozzle ring. The kinematic coupling can be achieved by a slotted guide in particular. It is useful for the slotted guide to comprise at least one radial projection that extends into a guide slot, the radial projection being directed perpendicular to the force application direction of the second positioner acting on the holding ring. It is preferable for the guide slot to be located on the holding ring and that it extend vertically downward, whereas the radial projection is connected to nozzle ring and faces radially. For example, the guide slot can be located in a fork-shaped part or can be inserted directly into the wall of the holding ring. The slotted guide causes the displacement motion of the holding ring to necessarily lead to a defined displacement of the nozzle ring in the direction of displacement of the holding ring.

The kinematic coupling described between the ridge of the holding ring and the radially moving nozzle ring section of the nozzle ring can also be useful when the second positioner as well as the first positioner act radially on the nozzle ring. In this case, the second positioner affects a shift of the actuating portion of the holding ring directly by the nozzle ring.

The upper end surface of the holding ring and the nozzle ring each have a beveled edge that is adapted to the passage shape of the annular gap.

It is preferable for the first positioner to comprise at least one actuator attached to the nozzle body and connected to the nozzle ring with an interconnected joint or coupling for compensating equalizing motions in a second axis.

The nozzle ring section of the nozzle ring bordering the annular gap at the nozzle outlet can be an elastically deformable sleeve. In this case, the first positioner has at least one actuator acting on the elastically deformable sleeve. According to a preferred embodiment of the extrusion nozzle according to the invention, two actuators are provided for displacing the elastically deformable sleeve. The actuators act on the elastically deformable sleeve radially, either directly or via a coupling, at force application points that are preferably offset by 180° relative to one another around the nozzle ring, and are preferred to be connected to the sleeve in such a way that radial pushing forces and radial pulling forces can be transmitted to the sleeve. The two actuators can be connected to a programmable controller for controlling the adjusting motions of the drives.

When the two actuators transfer identical but opposite adjusting forces to the elastically deformable sleeve, the sleeve is deformed symmetrically. The cross section of the sleeve takes on an oval cross-sectional shape or at least a base shape that approaches an ellipse, at least in the plane in which the radial pulling or pushing forces are applied. By correspondingly controlling the two actuators, it is also possible for the sleeve to be pivoted in the radial direction by actuating the actuators. A pivoting motion in the force application direction of the actuators and a deformation of the elastically deformable sleeve can also be combined with one another in order to strongly modify the shape off the nozzle gap during extrusion of preforms. By combining radially acting pulling and pushing forces that can act at the periphery of the sleeve offset by 180° for example, the sleeve can be pivoted in the force application direction. If the radial adjusting motions of the two actuators are made at different magnitudes and/or directions, the sleeve can be deformed and simultaneously radially moved or pivoted in the axis of motion. In all of these cases, a strong shaping of the nozzle gap shape is possible. There is also the possibility that the elastically deformable sleeve can also be displaced perpendicular to the force application direction of the actuators acting on the nozzle ring by tilting of the nozzle insert affected by shifting the holding ring. This makes possible adjustments in two axis directions of the nozzle ring relative to the mandrel.

Another embodiment of the extrusion nozzle according to the invention provides that the elastically deformable sleeve is supported at a plurality of brace formations on its outer surface and an actuator is provided that pushes on an outer side surface of the sleeve either directly or via a coupling. In particular, the actuator can be connected to couplings that act on the elastically deformable sleeve in pairs. The couplings are kinematically coupled, for example, and carry out opposing pincer movements when the actuators make an adjusting motion. These couplings can also be slides that each cooperate with a mating surface on the outer surface of the sleeve.

It is also an aspect of the invention that the nozzle ring section of the nozzle ring bordering the annular gap at the nozzle outlet is designed to be rigid. The first positioner then has at least one actuator acting on the rigid nozzle ring section. Likewise, the second positioner can act on the nozzle ring and can comprise an actuator that acts radially on the rigid nozzle ring section. In particular, the actuator or actuators can be connected to the nozzle ring via a joint or a coupling for compensating equalizing motions.

To be able to record the degree of displacement at the nozzle outlet, it is useful to assign to at least the nozzle ring a sensor that records the movements of the nozzle ring in the axes specified by the force application direction of the first positioner and the force application direction of the second positioner. The output from the sensor can be used to control the position of the nozzle insert and is useful for programmable controls that control the motions of the mandrel and/or the nozzle insert during extrusion of preforms. In the process, it can be advantageous for the tilting motion of the holding ring and the radial motions at the nozzle ring to be recorded separately. An advantageous embodiment of the device according to the invention provides that sensors are provided for the holding ring and the nozzle ring to record tilting of the holding ring in the force application direction of the second positioner and a radial movement of the nozzle ring superimposed on the tilting motion of the holding ring, the radial motion being in the force application direction of the first positioner.

The nozzle ring and the holding ring form core elements of the extrusion nozzle according to the invention. In all the embodiments described above, the nozzle ring borders the annular gap at the nozzle outlet of the extrusion nozzle. However, another aspect of the invention is to design the nozzle ring such that the nozzle insert can be extended downward using an additional replaceable nozzle ring. In the process, the additional replaceable nozzle ring is held by an axial slide seat in the nozzle ring of the nozzle insert and has a radially moving nozzle ring section below the slide seat, the nozzle ring section bordering the annular gap at the nozzle outlet. Another positioner can be assigned to the replaceable nozzle ring, the positioner acting in an arbitrary angle relative to the first positioner and the second positioner of the nozzle insert.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 2A and 2B show another embodiment of the extrusion nozzle also in axial section in two mutually perpendicular section planes;

FIGS. 3 to 7 are cross sections through arrangements of a plurality of extrusion nozzles next to one another, each of which is taken in the section plane I-I of FIGS. 1A and 1B;

FIGS. 14A and 14B are half sections on two mutually perpendicular section planes, each through a sixth embodiment of the invention.

SPECIFIC DESCRIPTION OF THE INVENTION

Figure 1A:
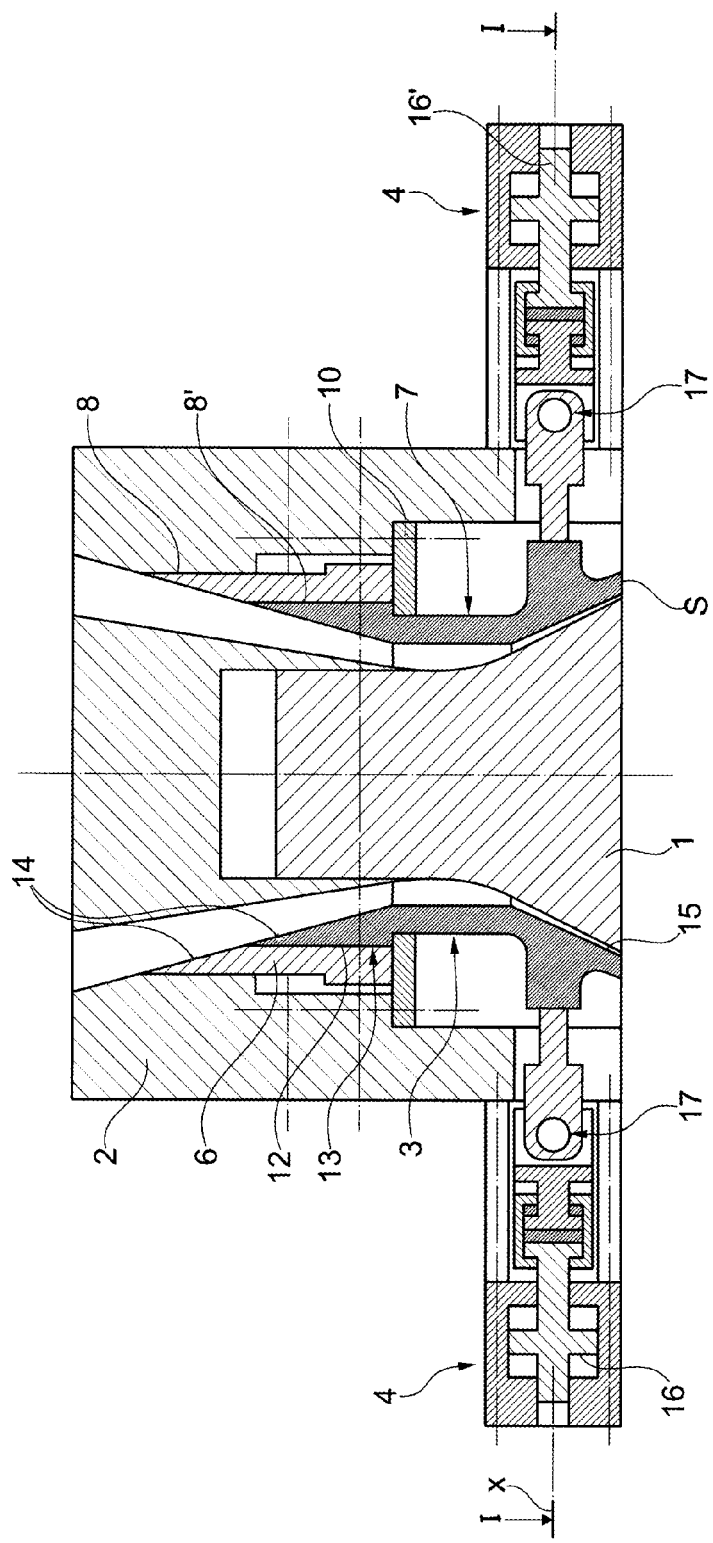
FIGS. 1A and 1B are axial sections through an extrusion nozzle for making tubular preforms in two mutually perpendicular section planes.
Figure 1B:
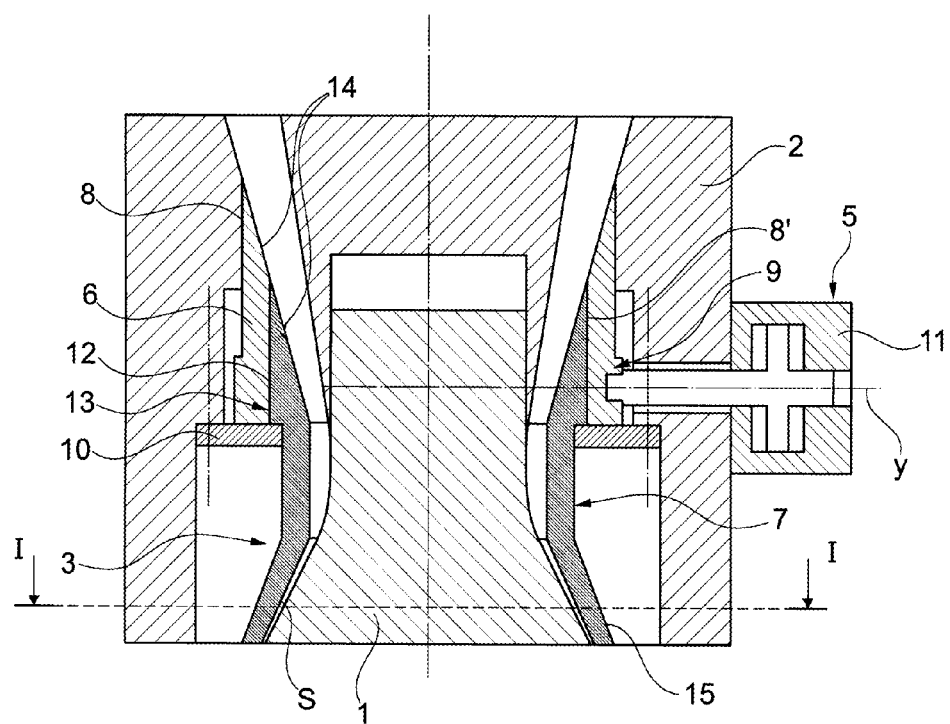

As seen in FIGS. 1A and 1B an extrusion nozzle according to the invention has a mandrel 1, a nozzle body 2, a nozzle insert ring 3 that surrounds the mandrel 1 and forms therewith an annular gap, and two positioners 4, 5, all centered on an axis A. A first positioner 4 is provided for displacing or elastically deforming the nozzle insert 3 along a first radial axis x. A second positioner 5 causes a tilting displacement of the nozzle insert 3 about a second radial axis y. In the illustrated embodiments, the two axes x, y extend at a right angle to one another. The positioners 4, 5 comprise drives whose actuation changes the shape of the annular gap s around its periphery. The mandrel 1 can also be displaced along the axis A. A programmable adjusting motion of the mandrel 1 can change the width of the annular gap s during extrusion of the preform.

FIGS. 1A and 1B show that the nozzle insert 3 has a holding ring 6 axially supported at its lower end and a nozzle ring 7 set in the holding ring 6. The holding ring 6 is guided inside the nozzle body 2 by a slide seat 8 and has a ridge 9 that can move radially and projects into an installation space of the nozzle body 2 below the slide seat 8. The nozzle ring 7 is supported axially inside or outside the holding ring 6 and is guided in the holding ring 6 by a slide seat 8'. The nozzle ring 7 has a radially movable nozzle ring section below the slide seat 8'. "Radially movable" means that there is an open space between the side surface of the holding ring 6 and the nozzle ring 7 and the wall surface of the nozzle body 2 bordering the installation space, the open space allowing radial movement of the holding ring 6 and the nozzle ring 7 below the respective slide seats 8, 8' thereof. Comparing FIGS. 1A and 1B, it is found that the first positioner 4 acts on the nozzle ring 7 in the radial force-application direction x and that the second positioner 5 acts radially on the ridge 9 of the holding ring 6 in the radial force-application direction y that is different from direction x.

The holding ring 6 is supported and can move radially on a support a support ring 10 fixed in the installation space of the nozzle body 2. The holding ring 6 has a cylindrical outer peripheral surface that is machined as a seat surface fitting in a cylindrical hole of the nozzle body 2. The cylindrical peripheral outer surface of the holding ring and the respective cylindrical hole of the nozzle body 2 are loosely fitted together. The holding ring 6 is a metal sleeve and can have an annular section between the slide seat 8 and a force application point for the second positioner 5, the annular section allowing bending of the holding ring 6 under the effect of a radial force produced by the second positioner 5. After releasing the radial force acting on the holding ring 6, the ring bends back elastically at least partially.

According to FIG. 1B, the second positioner 5 has at least one actuator 11 that acts on the holding ring 6 by a connection that transmits the radial pushing and pulling forces to the holding ring 6.

The nozzle ring 7 has a collar 12 on its upper end, the collar having a cylindrical sliding fit surface on its outer surface, the surface being surrounded by the holding ring 6. The sliding fit surface of the nozzle ring 7 and an associated cylindrical inner surface of the holding ring 6 are fitted together with play. The collar 12 of the nozzle ring 7 is supported at a support and can move radially. In the illustrated embodiment, the collar 12 of the nozzle ring 7 and the holding ring 6 are supported on the same support, which is a support ring 10.

FIGS. 1A and 1B also show that the collar 12 of the nozzle ring 7 and the section of the holding ring 6 surrounding the collar 12 form a rigid middle piece 13 of the nozzle insert 3 and that the second positioner 5 acts on the rigid middle piece 13 of the nozzle insert 3 to effect a tilting displacement of the nozzle insert 3.

The upper end surface of the holding ring 6 and the nozzle ring 7 each have a beveled edge 14 that is adapted to the passage shape of the annular gap, respectively.

In the illustrated embodiment shown in FIGS. 1A, 1B, the nozzle ring section of the nozzle ring 7 adjacent the annular gap at the nozzle outlet is an elastically deformable sleeve 15. The first positioner 4 has two actuators 16, 16' that act, either directly or via a coupling, radially on the elastically deformable sleeve 15 at force application points that are on the periphery of the nozzle ring 7 angularly offset from one another by 180°, for example. In the illustrated embodiments, the actuators 16, 16' of the first positioner 4 are each connected to the nozzle ring 7 via a joint or coupling 17 that compensates for equalizing motions in the second axis y.

The connection between the actuators 16, 16' and the elastically deformable sleeve 15 is designed such that radial pushing and pulling forces can be transmitted to the sleeve 15. The actuators 16, 16' are connected to a programmable controller.

Figure 2B:
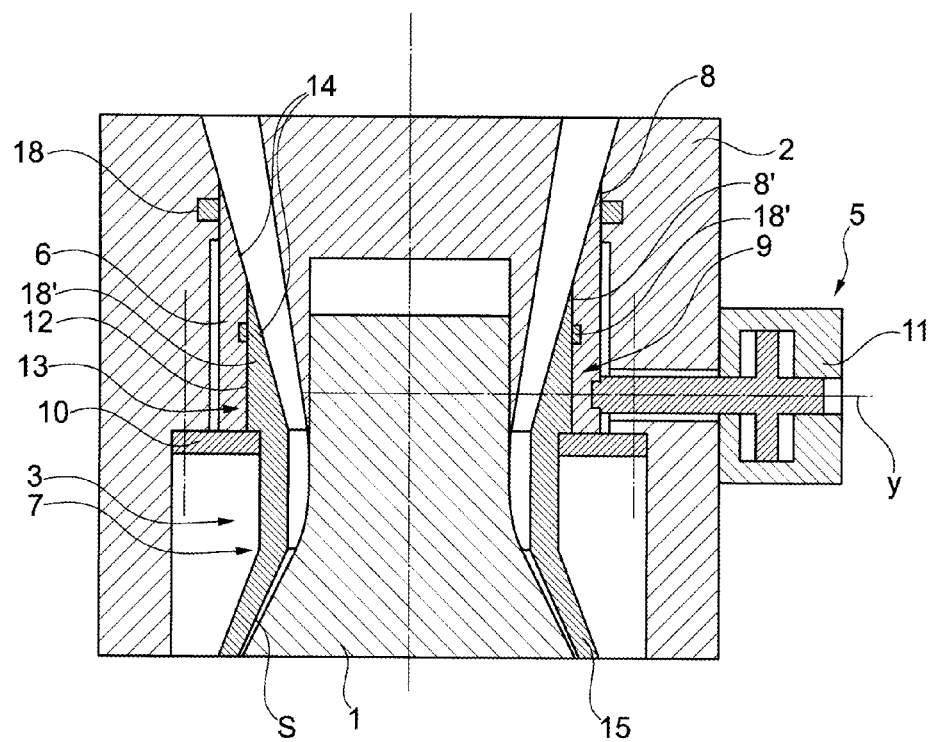

The extrusion nozzle shown in FIGS. 2A, 2B is described above. There are also ring seals 18, 18' between the components that are movable relative to one another. A ring seal 18 is provided between the nozzle body 2 and the holding ring 6 at the slide seat 8. Also provided between the holding ring 6 and the nozzle ring 7 is a ring seal 18' that is also in the slide seat 8'. The seals 18, 18' can be O-ring seals made of a temperature-resistant material. Suitable ring seals can include metal-clad soft material rings, corrugated metal rings with soft material layering, grooved-profile ring seals and elastomeric ring seals made of temperature-resistant polymers, for example. Also included here are metal packing and carbon packing as ring seals 18, 18'. In particular, the ring seals can also be tubular seals that laterally support the holding ring 6 and/or the nozzle ring 7 near the loose fit, thereby having a low-wear effect.

The extrusion nozzle, which is shown in FIGS. 14A and 14B in half-section each, is of the design described with reference to FIGS. 1A and 1B. In the embodiment of FIGS. 14A and 14B, the holding ring 6 has a cylindrical peripheral outer surface, the surface being machined as a seating surface and extending into an intermediate sleeve 31 in the nozzle body 2. The intermediate sleeve 31 is supported axially in the nozzle body and guided inside the nozzle body 2 by a slide seat. A purposeful loose fit is provided between the peripheral surface of the intermediate sleeve 31 and a cylindrical hole of the nozzle body 2. The flexibility and sealing function can be further improved by the intermediate sleeve 31.

In the illustrated embodiments of FIGS. 3 to 7, at least one actuator 16 is provided for displacing and/or deforming the elastically deformable sleeve 15, the actuator acting on an outer side surface of the sleeve 15 via a coupling formation 19, 19'. The sleeve is usually made of metal and is thin-walled. Other sleeve materials, such as temperature-resistant plastic and composite materials, can also be used. A preferred embodiment of the sleeve 15 is one that can be deformed both by radial pressure and radial tension forces. During extrusion of the preforms, the cross-sectional shape of the sleeve 15 is changed so as to affect the shape of the annular gap s.

In the illustrated embodiment of FIG. 3, when an adjusting motion is made, each of the coupling formations 19 acts on one side on an outer side surface of a respective sleeve 15 that is supported at a plurality of brace formations 20 around its periphery. The number and position of the brace formations 20 affects the cross section of the sleeve 15 by adjusting by elastic deformation when the coupling formation 19 acting on one side is actuated. In the illustrated embodiment, there are three brace formations 20 provided that are equidistant to one another at the periphery of the sleeve 15, one of the brace formations 20 being positioned offset by 180° relative to the force application point of the coupling formation 19.

In the illustrated embodiment of FIG. 4, the coupling formations 19, 19' act in pairs on the sleeve 15 and are kinematically coupled. The coupling formations 19, 19', each of which is associated with a respective sleeve 15, execute opposing pincer movements when the actuator 16 makes an adjusting motion. The actuator 16 is a pneumatic, hydraulic or electromagnetic unit for generating a linear motion of a sliding element. The sliding element cooperates with a linearly moving positioning element that executes an opposite movement derived from the linear motion. In addition, the sleeve 15 can be supported at brace formations 20 according to FIG. 4. It is preferable for four brace formations 20 to be provided directed at an angle of +/−45° relative to the deformation axis. The deformation axis is determined by the force application points of the coupling formations 19, 19'.

Independent base adjustments can be made in arrangements made up of a plurality of extrusion nozzles, these adjustments involving the predeformation of the sleeves 15 of the extrusion nozzles and/or correction of the position of the sleeves 15 and/or the displacement of the nozzle insert 3 and the mandrel 1 of the extrusion nozzles relative to one another. To modify the base adjustment of the extrusion nozzles, individual respective independently actuatable positioning elements 21, 21' are provided. According to FIG. 4, positioning elements 21 are provided on the coupling formations 19, 19' that act radially on the outer surface of the respective sleeves 15. By actuating this positioning element 21, the respective sleeve 15 associated with the positioning element 21 can be deformed and the position thereof can be corrected. Also provided are positioning elements 21' that act on the nozzle insert 3 of the extrusion nozzles and that enable a position correction of the nozzle insert 3 relative to the mandrel 1 of the extrusion nozzle. The change in a base adjustment at the extrusion nozzles is advantageous since in the manufacture of small blow-molded hollow members a small difference in the radial nozzle gap area from one extrusion nozzle to the next extrusion nozzle results in big differences in wall thickness of the preforms. Therefore, it is important that every coupling formation 19, 19' that acts on the sleeve 15 has a respective positioning element 21 to compensate for manufacturing tolerances. Also, the rheological behavior of the plastic melt, manufacturing tolerances in the flow passages of the extrusion nozzles, and temperature differences can result in deviations in the tubular shape of the preforms exiting the extrusion nozzles and the radial wall thickness distribution of the individual preforms exiting the various extrusion nozzles. To correct these effects, it can be useful if the base shape of the sleeve 15 and the position thereof can be corrected at each sleeve 15 by the various positioning elements 21. The same applies to a correction of the position between the nozzle insert 3 and the mandrel 1 using the positioning elements 21'.

Figure 5:
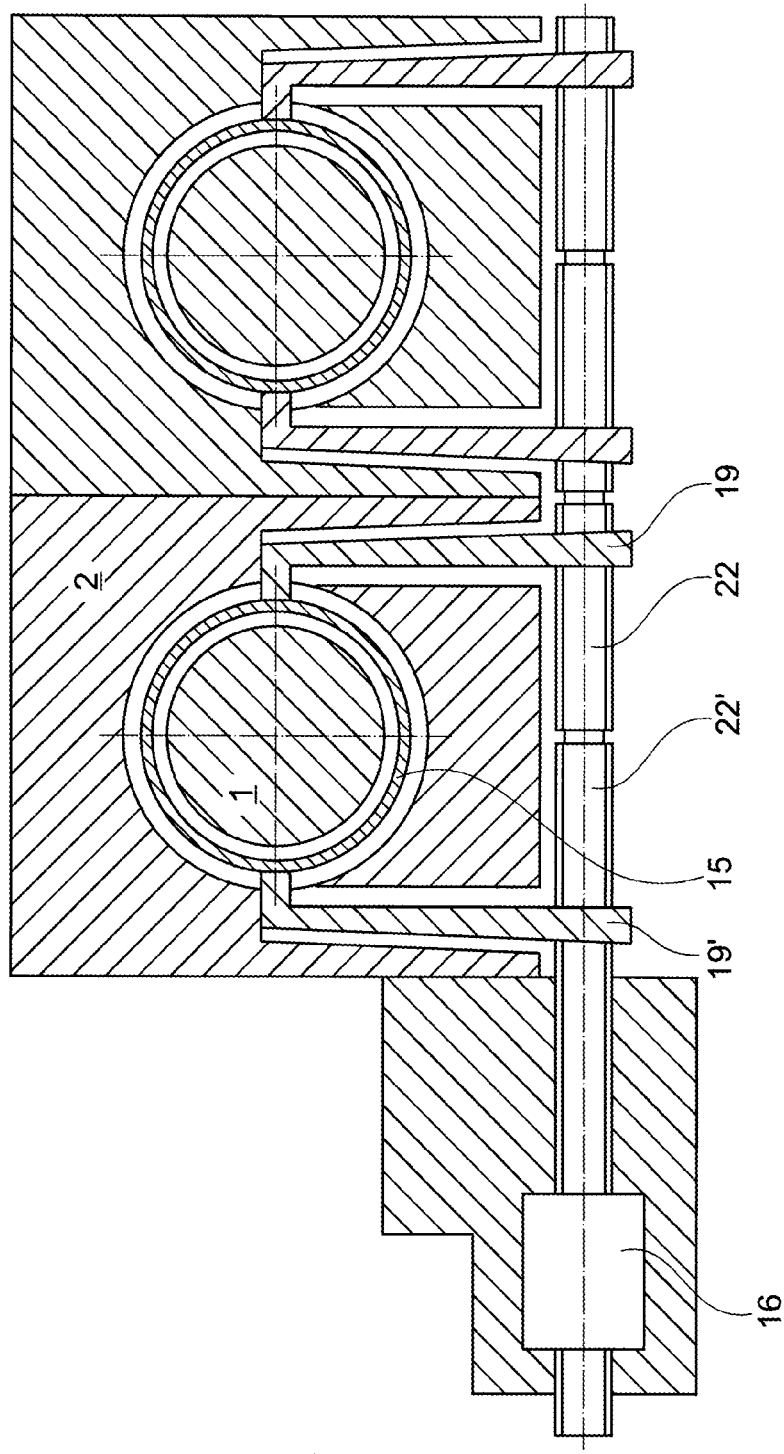
Figure 6:
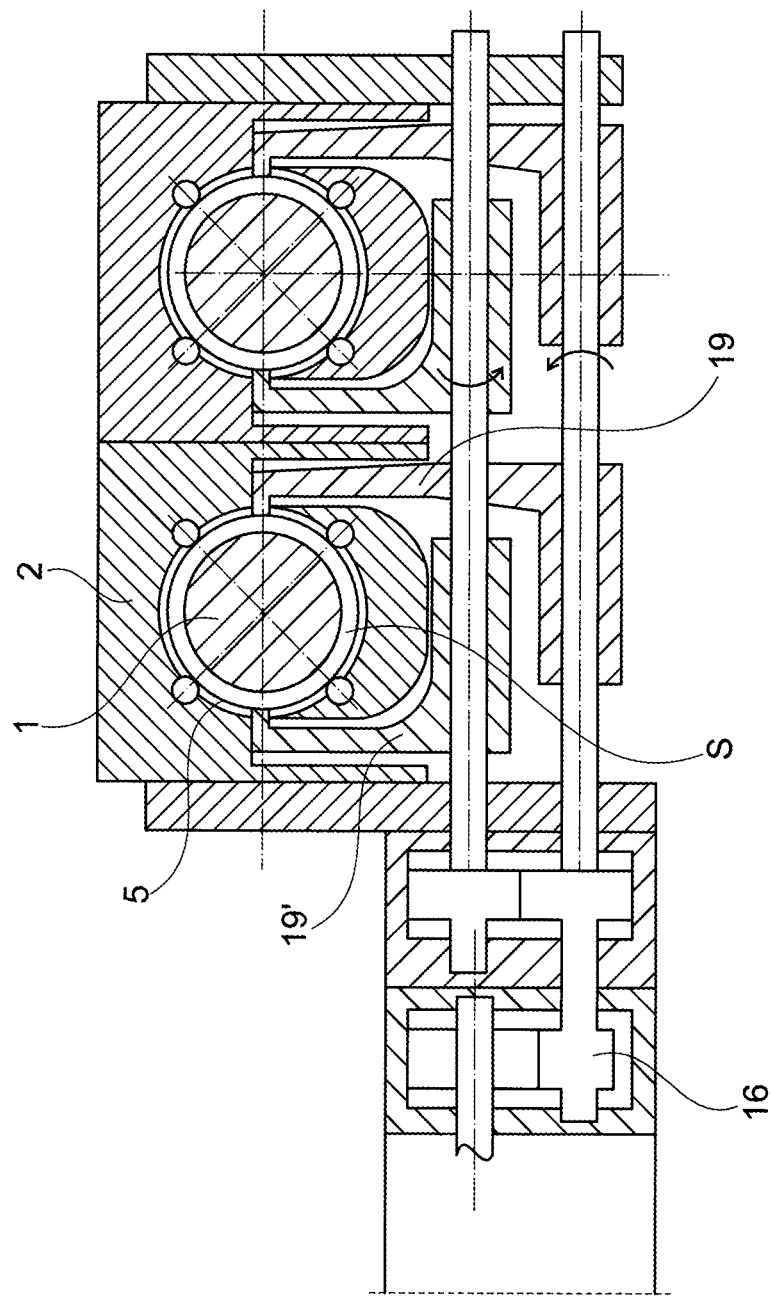

Also, in the illustrated embodiments of FIGS. 5 and 6 the coupling formations 19, 19' act in paired fashion on sleeves 15 and exert pressure on both sides of the respective sleeve 15 during an adjustment. The coupling formations 19, 19' of each pair are kinematically coupled and carry out opposing pincer movements when their actuator makes an adjusting motion. According to FIG. 5, the actuator 16 is a spindle drive and has a rotatably mounted output spindle with right-hand and left-hand threaded sections 22, 22' so one element of the coupling pair associated with each sleeve 15 is connected to a right-hand threaded section 22 and the other element of the pair is connected to the left-hand threaded section 22'.

In the illustrated embodiment of FIG. 6, the actuator 16, which is also a spindle drive, has two kinematically coupled output spindles that rotate in opposite directions, one coupling formation 19 of the couplings associated with the respective sleeves being connected to a first output spindle and the other coupling of the pair being connected to the second output spindle.

Figure 7:
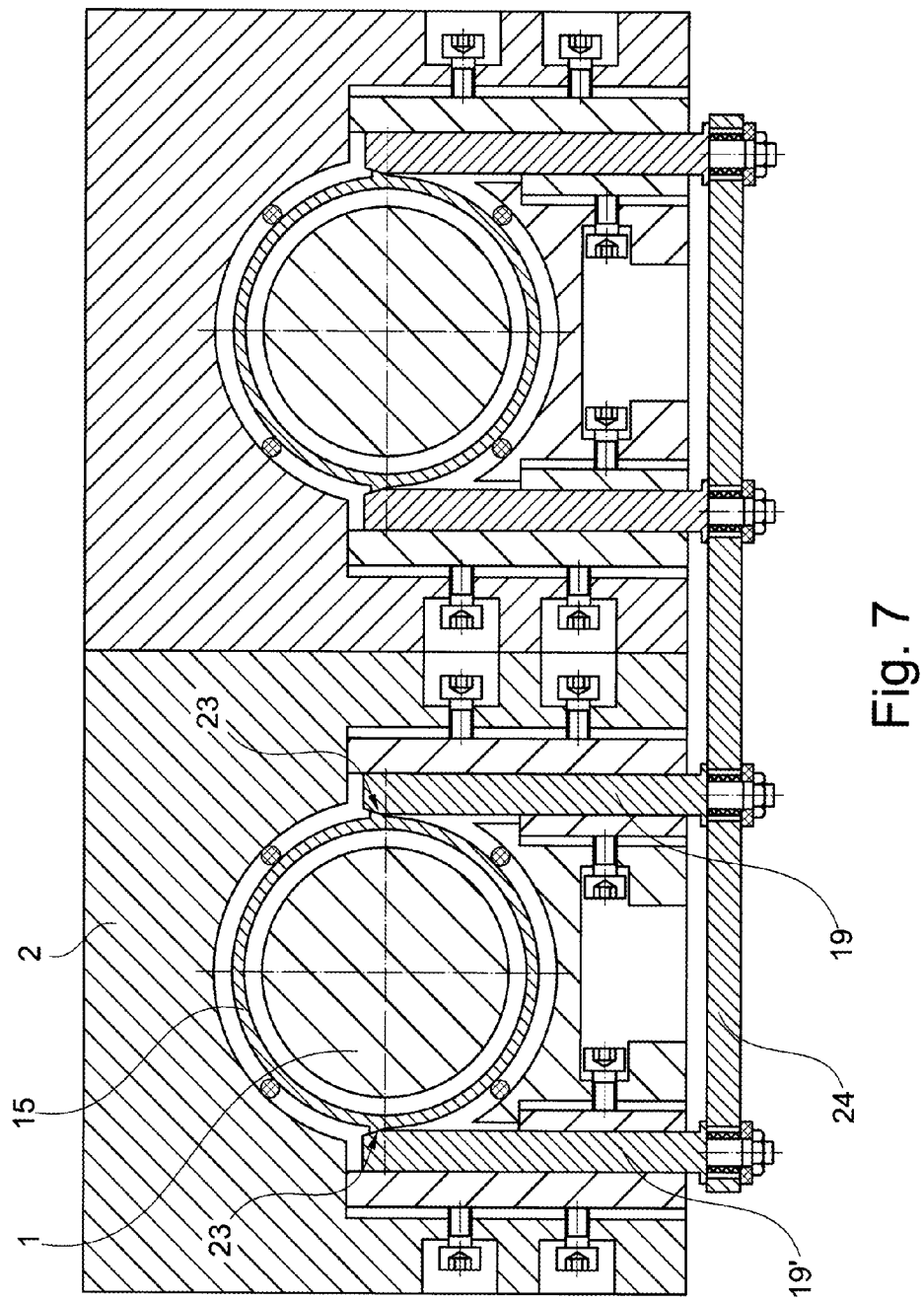

The coupling formations 19, 19' can also be slides that each have a cam surface 23 that cooperates with a surface of the respective sleeve 15. Such a mechanical solution is shown in FIG. 7. The cam surfaces 23 consist of a chamfered end of the slide. The slides exert pressure on both sides of the respective sleeve 15 when an adjusting motion is made and deform the sleeve elliptically. The slides, which are connected at the back to a common cross member 24, are passed between pressure plates whose position is adjustable by positioning means. By adjusting the pressure plates, base adjustments can be made at the extrusion nozzles individually. The positions of the sleeves 15 can be corrected by these base adjustments. Also, individual predeformations of the sleeve 15 are possible.

Figure 8:
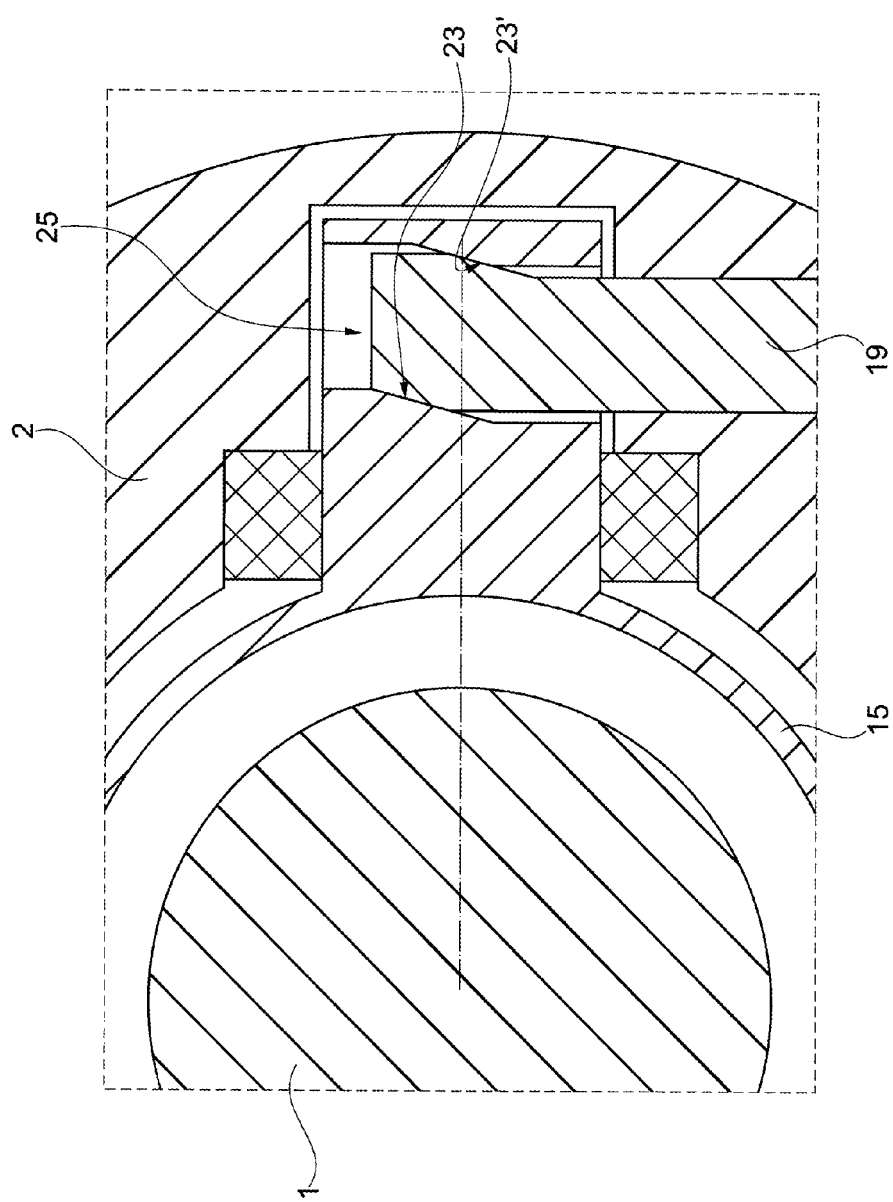
FIGS. 8 and 9 are cross sections through another extrusion nozzle.

The connection region 25 between the coupling formation 19, which is a slide, and a sleeve 15 can be configured such that pulling forces are transmitted to surfaces of the sleeve 15 when the coupling formations 19 make adjusting motions and the sleeves 15 are deformed elliptically by pulling forces acting on both sides. In this case, the slides act on control surfaces connected to the sleeves 15. The connection region 25 between the coupling formations 19 and the sleeves 15 can also be designed such that a pulling force or a pushing force is transmitted to the sleeves during an adjusting motion of the coupling formations 19 as a function of the adjustment path. A corresponding connection element is shown in FIG. 8. The coupling formation 19 extends into the connection element, which is connected to the sleeve 15 and has a cam surface 23 for transmitting radial pushing forces and a cam surface 23' for transmitting radial pulling forces.

Figure 9:
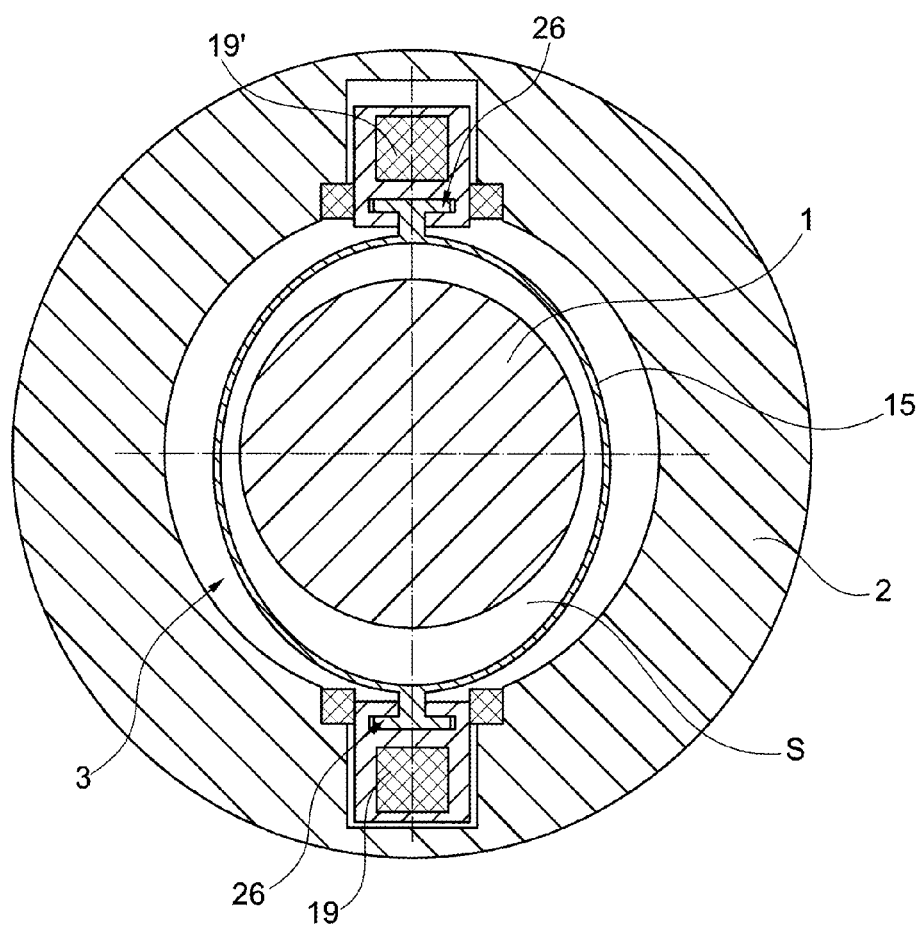

In the section of FIG. 9, an example of a nozzle gap geometry is shown whose geometry is adjustable between the mandrel 1 and the nozzle insert 3. The coupling formations 19, 19' extend into connection elements that are removably connected to the sleeve 15 through positive locking elements 26. The elastically deformable sleeve 15 is exchangeable without having to remove the connection elements and associated coupling formations 19.

Considering the illustrated embodiments shown in FIGS. 3 to 9, it remains to be noted that the second positioner 5 can also comprise a plurality of couplings that synchronously transfer adjusting motion of an actuator to the actuating portion 9 of the holding ring 6 of a plurality of extrusion nozzles disposed next to one another.

Figure 10A:
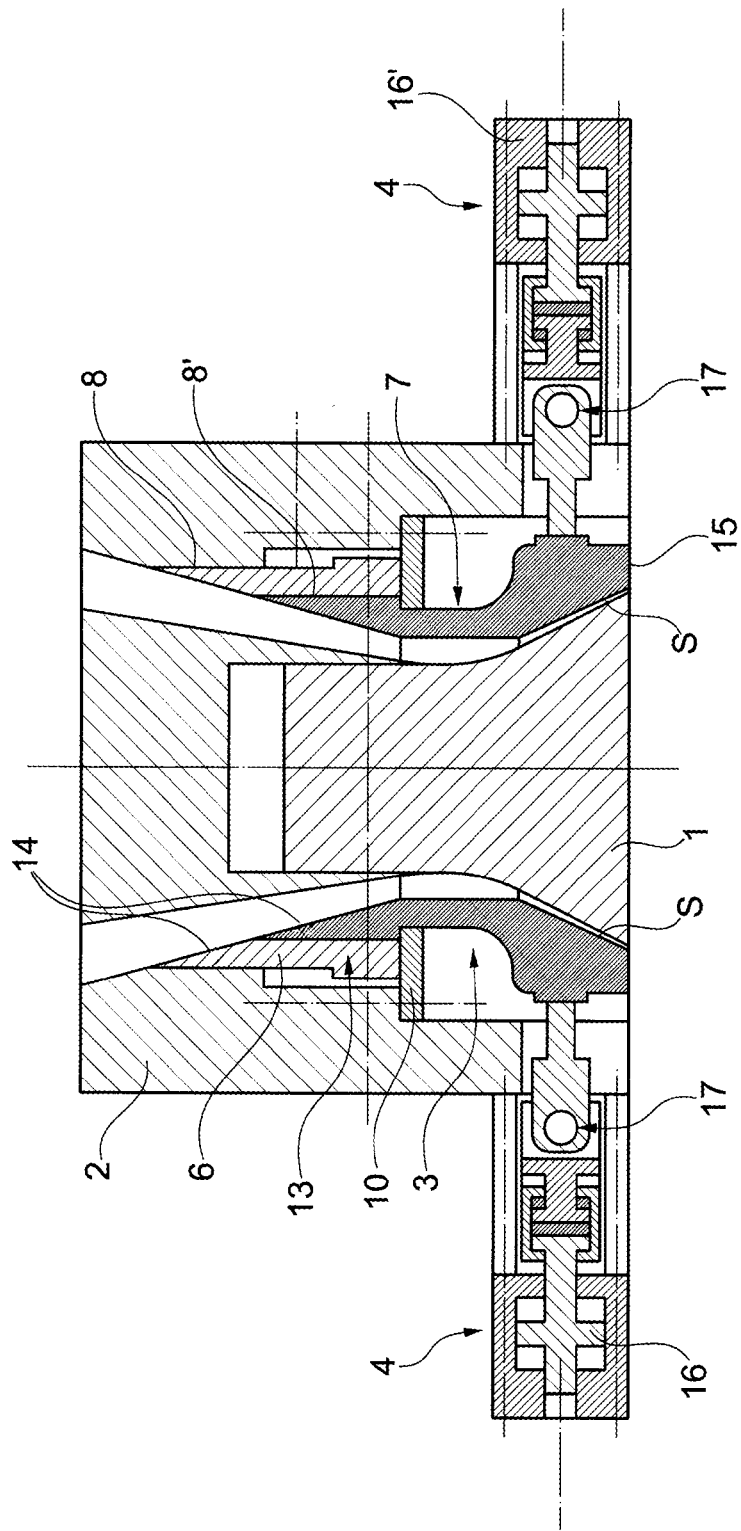
FIGS. 10A and 10B are axial sections through a second embodiment of the extrusion nozzle in two mutually perpendicular section planes.
Figure 10B:
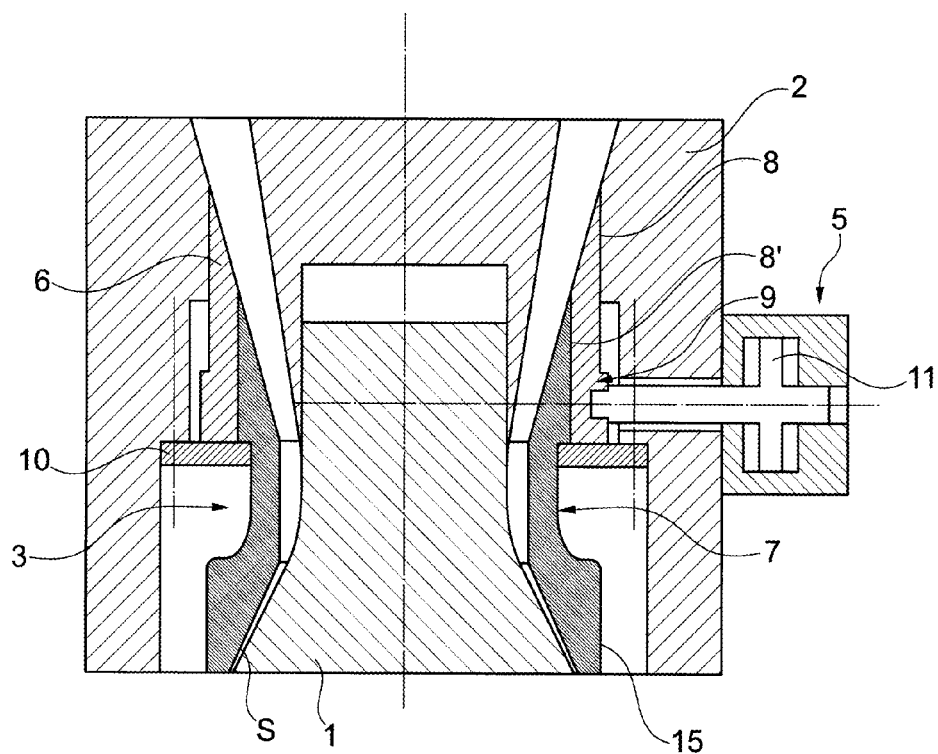
Figure 11:
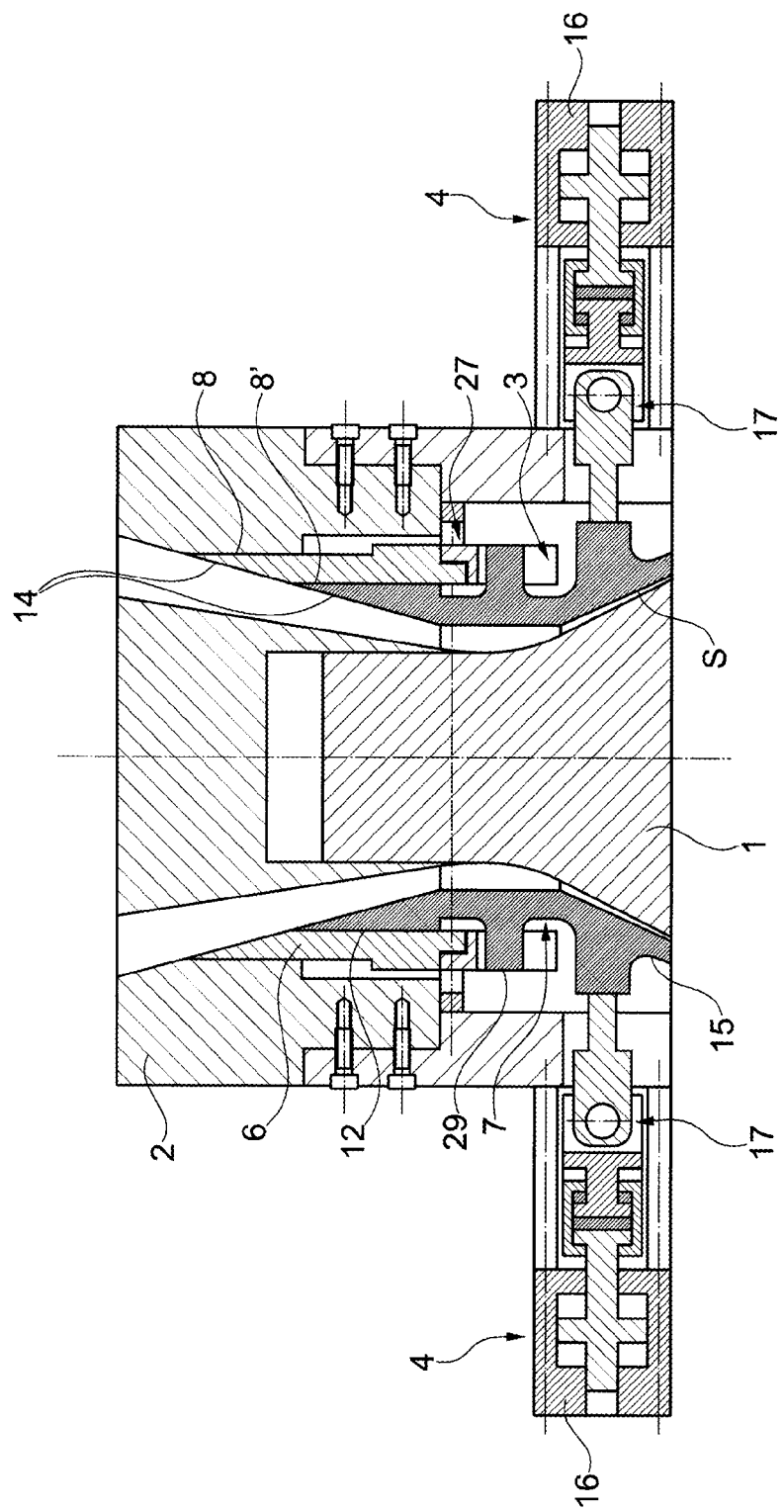
FIG. 11 is an axial section through a third embodiment of the extrusion nozzle in the section plane of a first positioner acting on the nozzle ring.

According to the embodiments of the extrusion nozzle according to the invention shown in FIGS. 10A and 10B and FIGS. 15A and 15B, the nozzle ring 7 has a section adjacent the annular gap s at the nozzle outlet, the section being designed to be rigid. The first positioner 4 has at least one actuator 16 that acts on the rigid nozzle ring section, whereas in each of the illustrated embodiments, two actuators 16, 16' are actually provided. By actuating both the actuators 16, 16' of the first positioner 4 and the actuator 11 of the second positioner 5, the rigid nozzle ring section can be shifted in two axial directions x, y relative to the mandrel 1 in order to affect the nozzle gap geometry. In FIGS. 10A and 10B, the actuator 11 of the second positioner 5, as in all embodiments described up until now, acts radially on the actuating portion 9 of the holding ring 6, the actuating portion projecting into an installation space of the nozzle body 2 below the slide seat 8 of the holding ring, and being movable radially. According to the FIGS. 15A and 15B, the actuator 11 of the second positioner 5 is associated with the nozzle ring 7 and also acts radially on the nozzle ring 7 as do the actuators 16, 16' of the first positioner.

In the illustrated embodiments shown in FIGS. 11, 12, 13A and 13B, the second positioner 5 is associated with the holding ring 6 and acts radially on the actuating portion 9 of the holding ring 6. According to FIG. 11, the actuating portion 9 of the holding ring 6 and the radially movable nozzle ring section of the nozzle ring 7 are kinematically coupled. The kinematic coupling is achieved by a slotted guide 27. In the illustrated embodiment, this guide has at least one radial projection 29 that extends into a guide slot and is directed perpendicular to the direction of force application of the second positioner 5 that acts on the holding ring 6 and can be a pin, for example. The guide slot is formed in the holding ring 6 and extends vertically downward. The guide slot can be incorporated into the wall of the holding ring 6. In the illustrated embodiment, the slot is a forked guide piece fastened to the holding ring 6. The projection 29 is connected to the nozzle ring 7 and extends radially. The kinematic coupling between the nozzle ring 7 and the holding ring 6 causes a tilting displacement of the holding ring 6 to result in a defined, verifiable and reproducible change in the position of the nozzle ring 7. It is useful to provide the nozzle ring with a sensor (not shown) that records the movements of the nozzle ring 7 along the axes defined by the direction of force application of the first positioner 4 and the direction of force application of the second positioner 5. The measured values from the sensor can then be used to control the position of the nozzle insert 3.

Figure 13A:
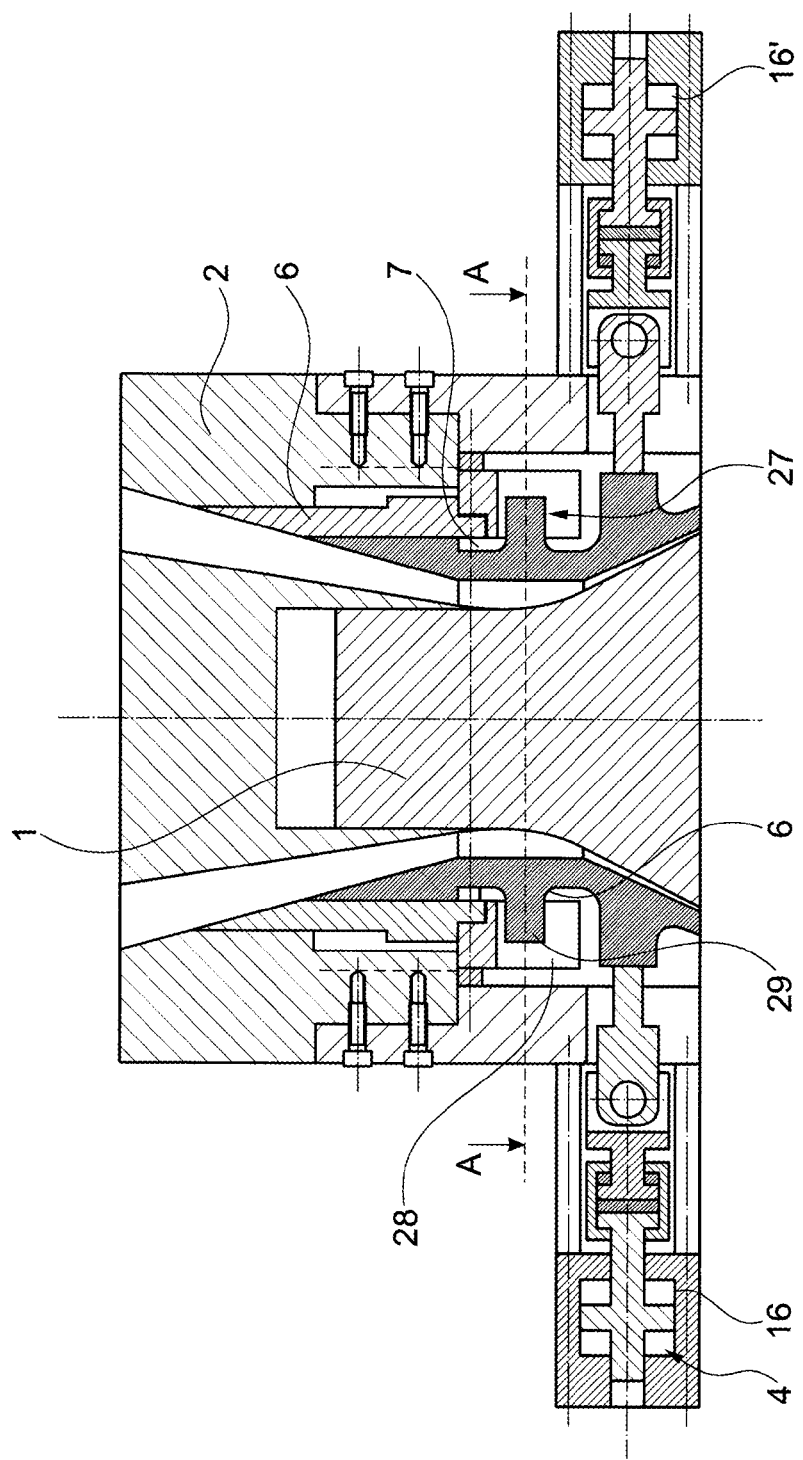
FIG. 13A is an axial section through a fifth embodiment of the extrusion nozzle.
Figure 13B:
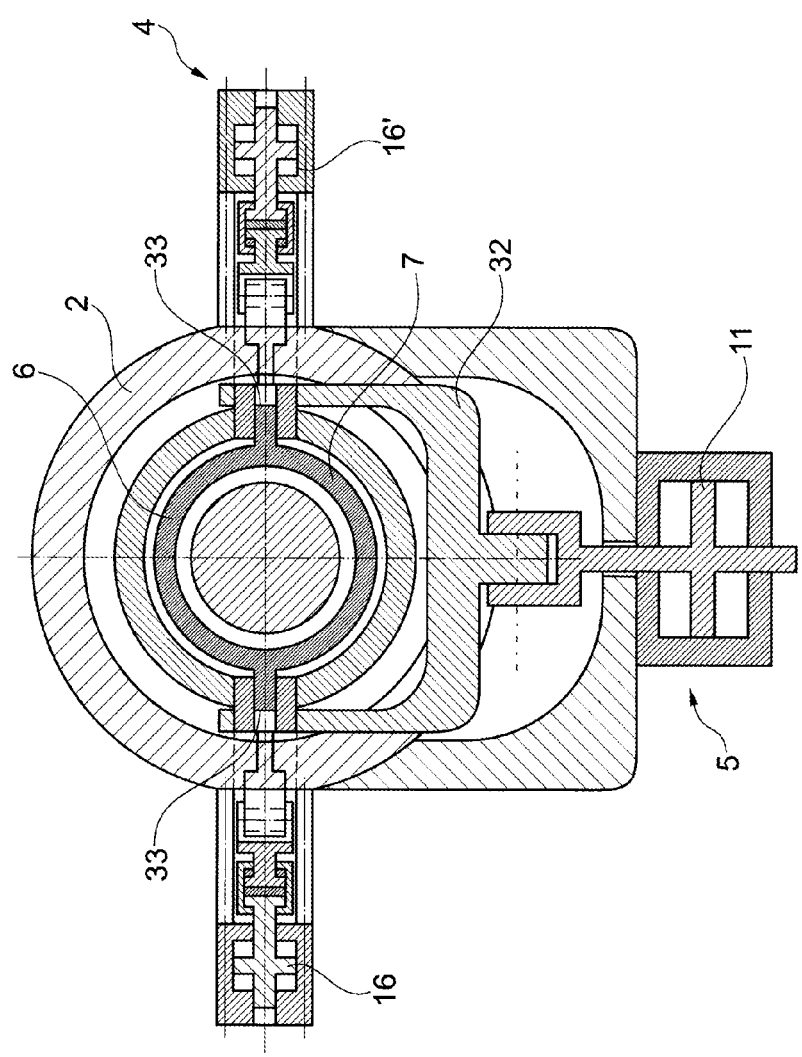
FIG. 13B is a horizontal section through the nozzle of FIG. 13A.
Figure 15A:
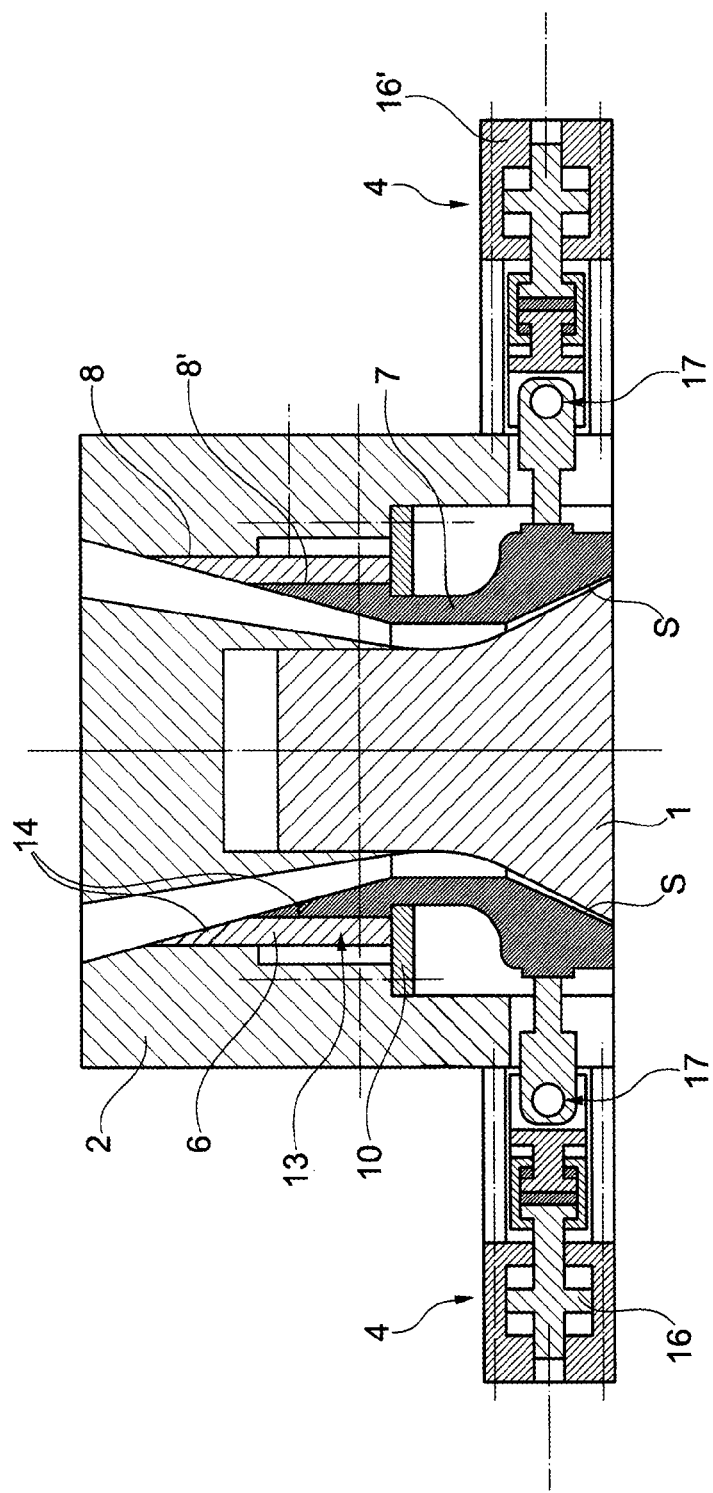
FIGS. 15A and 15B are axial sections in two mutually perpendicular section planes through an embodiment variation of the extrusion nozzle shown in FIGS. 10A and 10B.
Figure 15B:
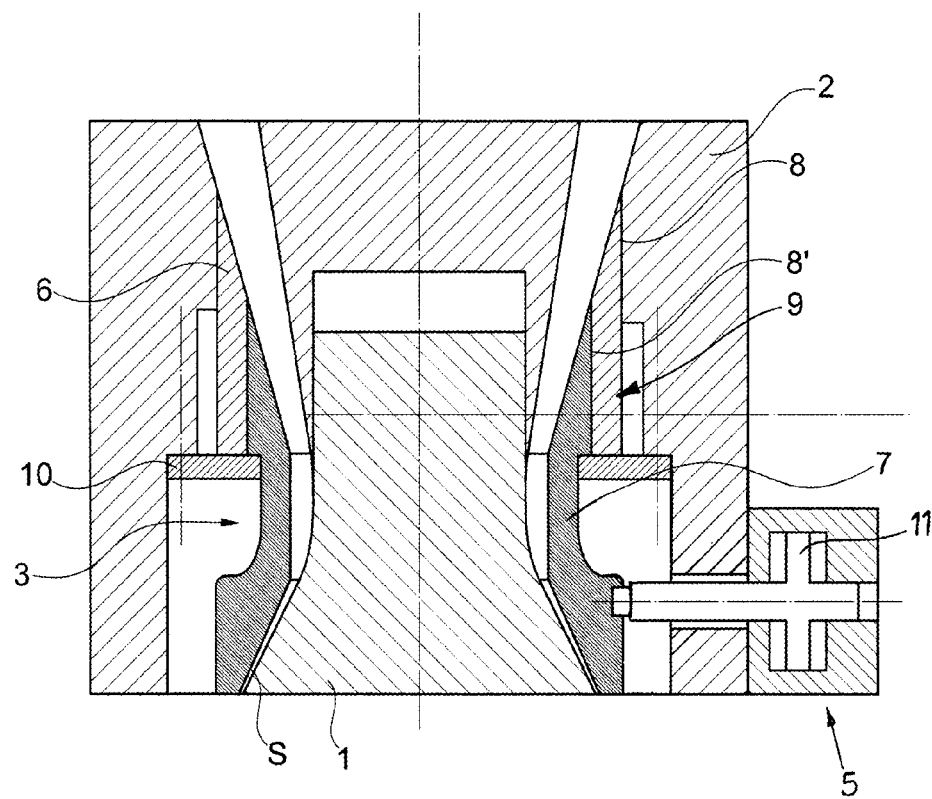

In an illustrated embodiment shown in FIGS. 13A and 13B, the actuating portion 9 of the holding ring 6 and the radially movable nozzle ring section of the nozzle ring 7 are also kinematically coupled. The kinematic coupling is achieved by a slotted guide that has two radial projections 29 that extend into respective guide slots 28. The radial projections 29 extend perpendicular to the direction of force application of the second positioner that acts on the holding ring 6 and are guide pins. The second positioner 5 has a connector fork 32 connected to the slotted guide 27 and transmitting the adjusting motion of the second positioner to the holding ring 6. The fork is pivoted on the actuator 11 of the second positioner 5. The direction of force application of the second positioner 5 is radially directed to the ridge 9 of the holding ring 6, the force being introduced at two force application points 33 opposite one another. This results in the deformation force acting locally on the holding ring 6 being lower, and allows the ring section where the force is introduced to be designed with a lower degree of rigidity.

Figure 12:
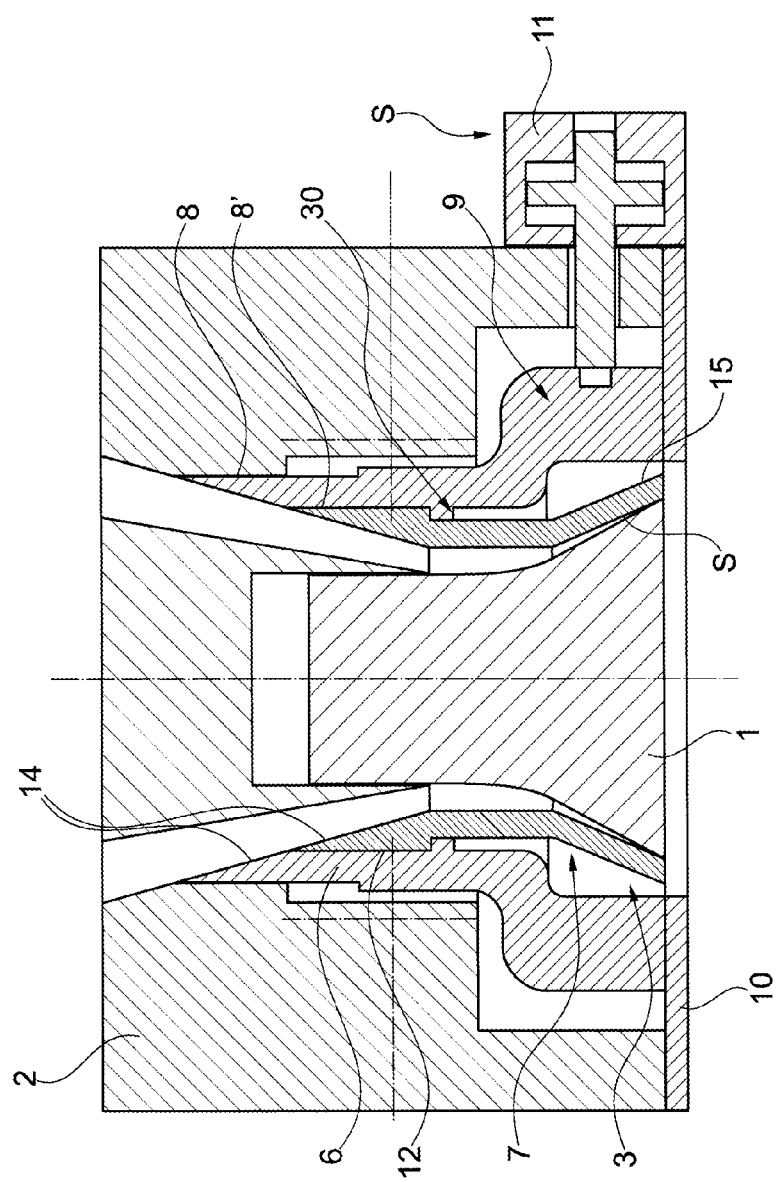
FIG. 12 is an axial section through a fourth embodiment of the extrusion nozzle in the section plane of a second positioner acting on the holding ring.

In the illustrated embodiment of the extrusion nozzle according to the invention as shown in FIG. 12, the holding ring 6 extends to the bottom end of the nozzle insert 3 and is carried on a support while being radially movable, the support being at the bottom end of the nozzle body 2 and being a support ring 10, for example. The second positioner 5 acting on the holding ring 6 and the first positioner 4 acting on the nozzle ring 7 are at about the same level. The nozzle ring 7 is attached to the holding ring 6 below the slide seat 8' of the nozzle ring by a removable positive-lock connection 30 that permits relative radial movements. In particular, the positive-lock connection 30 can be a bayonet joint. An advantage of this support is that the nozzle ring 7 can be rapidly replaced using the bayonet joint.

In all embodiments, the actuators 16, 16' of the first positioner 4 and the actuator 11 of the second positioner 5 are supported on the nozzle body 2. It is also an aspect of the invention that the adjusting motions of the first positioner 4 and the second positioner 5 are coupled. In particular, a coupling can be provided in such a fashion that only the actuator/actuators of one of the two positioners 4, 5 is/are supported on the nozzle body and the actuator/actuators of the other positioner is/are cooperatively moved and supported thereby.

Embodiments of the extrusion nozzle according to the invention were illustrated with the aid of the illustrated embodiments in order to affect the radial nozzle gap shape at the nozzle outlet by displacing a nozzle insert made of a plurality of parts. The features of the embodiment shown can be combined in any manner.

We claim:

1. An extrusion nozzle for making tubular preforms, the extrusion nozzle comprising:
   a mandrel extending along a vertical axis;
   an annular and stationary nozzle body spacedly radially from and surrounding the mandrel;
   a holding ring having an upper end axially slidable in the nozzle body, braced axially downwardly against the nozzle body, and having a lower end spaced radially inward from and shiftable limitedly radially relative to the nozzle body, the nozzle body and the upper end of the holding ring have complementary, radially engaging, and cylindrical axial-sliding surfaces centered on the axis;
   an intermediate sleeve set in the nozzle body and having an inner cylindrical slide surface centered on the axis, the upper end of the holding ring having an outer cylindrical slide surface axially slidable on the inner surface of the intermediate sleeve;

a nozzle ring having an upper end axially slidable in the holding ring, braced axially downwardly against the nozzle body, and having a radially deflectable lower end kinematically coupled to the lower end of the holding ring and forming an annular extrusion gap with the mandrel;

a first positioner engageable with the lower end of nozzle ring and operable to radially deflect the lower end thereof; and a second positioner engageable radially with the lower end of the holding ring for radially deflecting same.

2. The extrusion nozzle defined in claim 1, further comprising:

a support fixed on the body, the lower end of the holding ring resting on the support.

3. The extrusion nozzle defined in claim 1, wherein the lower end of the holding ring is generally axially level with the lower end of the nozzle ring.

4. The extrusion nozzle defined in claim 1, wherein the sliding surfaces fit together with play.

5. The extrusion nozzle defined in claim 1 wherein the second positioner engages the lower end of the holding ring at a force-application point and the holding ring is elastically deformable between the point and the upper end of the holding ring.

6. The extrusion nozzle defined in claim 1, wherein the upper end of the nozzle ring is formed as a radially outwardly projecting collar having an outer cylindrical surface centered on the axis.

7. An extrusion nozzle for making tubular preforms, the extrusion nozzle comprising:

a mandrel extending along a vertical axis;

an annular and stationary nozzle body spacedly radially from and surrounding the mandrel;

a holding ring having an upper end axially slidable in the nozzle body, braced axially downwardly against the nozzle body, and having a lower end spaced radially inward from and shiftable limitedly radially relative to the nozzle body;

a nozzle ring having an upper end axially slidable in the holding ring, braced axially downwardly against the nozzle body, and having a radially deflectable lower end kinematically coupled to the lower end of the holding ring and forming an annular extrusion gap with the mandrel;

a first positioner engageable with the lower end of nozzle ring and operable to radially deflect the lower end thereof;

a second positioner engageable radially with the lower end of the holding ring for radially deflecting same; and a coupling formed by:
  a radial projection on one of the rings extending perpendicular to a force-application direction of the second positioner and
  an angularly closed slot formed in the other of the rings in which the projection engages.

8. The extrusion nozzle defined in claim 7, wherein the angularly closed slot is on the holding ring and opens axially downward and the radial projection is on the nozzle ring.

9. The extrusion nozzle defined in claim 8, wherein the second positioner has a connector fork engaged in the slot and connected there to the holding ring.

10. The extrusion nozzle defined in claim 9, wherein the second positioner has an actuator on which the connector fork is pivoted.

11. The extrusion nozzle defined in claim 1, wherein the first positioner has a first actuator and a first coupling connecting the first actuator to the nozzle ring.

12. The extrusion nozzle defined in claim 11, wherein the lower end of the nozzle ring is an elastically deformable sleeve that is connected by the first coupling to the first actuator.

13. The extrusion nozzle defined in claim 11, wherein the first positioner further comprises:

a second actuator connected by a second coupling to the sleeve and angularly spaced from the first actuator.

14. An extrusion nozzle for making tubular preforms, the extrusion nozzle comprising:

a mandrel extending along a vertical axis;

an annular and stationary nozzle body spacedly radially surrounding the mandrel;

a holding ring having an upper end axially slidable in the nozzle body, braced axially downwardly against the nozzle body, and having a lower end spaced radially inward from and shiftable limitedly radially relative to the nozzle body, the nozzle body and the upper end of the holding ring having complementary, radially engaging, and cylindrical axial-sliding surfaces centered on the axis;

an intermediate sleeve set in the nozzle body having an inner cylindrical slide surface centered on the axis, the upper end of the holding ring having an outer cylindrical slide surface axially slidable on the inner surface of the intermediate sleeve;

a nozzle ring having an upper end axially slidable in the holding ring, braced axially downwardly against the nozzle body, and having a radially deflectable lower end forming an annular extrusion gap with the mandrel;

a first positioner engageable in a first radial direction with the lower end of nozzle ring and operable to radially deflect the lower end thereof in the first direction; and a second positioner engageable radially in a second radial direction angularly offset angularly from the first direction with the nozzle ring for radially deflecting same in the second direction.

15. The extrusion nozzle defined in claim 14, further comprising:

a support fixed on the body, the lower end of the holding ring resting on the support.

16. The extrusion nozzle defined in claim 15, wherein the lower end of the holding ring is generally axially level with the lower end of the nozzle ring.

17. The extrusion nozzle defined in claim 14, wherein the sliding surfaces fit together with play.

18. The extrusion nozzle defined in claim 14, wherein the upper end of the nozzle ring is formed as a radially outwardly projecting collar having an outer cylindrical surface centered on the axis.

19. The extrusion nozzle defined in claim 14, wherein the lower end of the nozzle ring is rigid and relatively nondeformable and the nozzle ring is elastically deformable between its upper and its lower ends, the first positioner engaging the lower end of the nozzle ring.

20. The extrusion nozzle defined in claim 19, wherein each of the positioners comprises a respective actuator and a respective coupling connecting the respective actuator to the lower end of the nozzle ring.

* * * * *